United States Patent
Creamer et al.

(10) Patent No.: US 7,433,690 B2
(45) Date of Patent: Oct. 7, 2008

(54) CONVERSION OF VOICE-OVER-IP MEDIA CONTROL MESSAGING INTO MOBILE CONTROL CHANNEL SIGNALING USING A VOICE-OVER IP GATEWAY

(75) Inventors: Thomas E. Creamer, Boca Raton, FL (US); Neil A. Katz, Parkland, FL (US); Victor S. Moore, Boynton Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 264 days.

(21) Appl. No.: 10/736,309

(22) Filed: Dec. 15, 2003

(65) Prior Publication Data

US 2005/0128981 A1    Jun. 16, 2005

(51) Int. Cl.
*H04Q 7/20* (2006.01)
(52) U.S. Cl. .................. 455/437; 455/436; 455/438; 455/442
(58) Field of Classification Search .......... 455/439, 455/432.2, 433, 435.2, 436, 552.1; 370/331, 370/332, 333
See application file for complete search history.

(56) References Cited

U.S. PATENT DOCUMENTS

| | | | |
|---|---|---|---|
| 6,018,521 A | 1/2000 | Timbs et al. | |
| 6,317,609 B1 | 11/2001 | Alperovich et al. | |
| 6,374,102 B1 | 4/2002 | Brachman et al. | |
| 6,385,195 B2 | 5/2002 | Sicher et al. | |
| 6,487,406 B1 | 11/2002 | Chang et al. | |
| 2003/0119527 A1* | 6/2003 | Labun et al. | 455/456 |
| 2004/0146021 A1* | 7/2004 | Fors et al. | 370/331 |
| 2004/0192294 A1* | 9/2004 | Pan et al. | 455/432.1 |
| 2004/0203785 A1* | 10/2004 | Sundquist et al. | 455/436 |
| 2004/0203788 A1* | 10/2004 | Fors et al. | 455/439 |
| 2005/0043051 A1* | 2/2005 | Takano et al. | 455/522 |
| 2005/0090259 A1* | 4/2005 | Jain et al. | 455/439 |
| 2005/0286501 A1* | 12/2005 | Higuchi | 370/352 |

\* cited by examiner

*Primary Examiner*—Duc Nguyen
*Assistant Examiner*—Dai A Phuong
(74) *Attorney, Agent, or Firm*—Akerman Senterfitt

(57) ABSTRACT

A gateway serving as an interface between a mobile network and a wireless network can be configured to send a signal strength indicator to the mobile network thereby causing the mobile network to recognize the gateway as a valid path for handing off a call. The wireless network can be configured according to one of the 802.11 wireless communications protocols. The gateway can route the call from the mobile network to a wireless access point of the wireless network via a packet-switched network, such that the call is conducted via a wireless communications link with the wireless access point.

7 Claims, 3 Drawing Sheets

CONVERSION OF VOICE-OVER-IP MEDIA CONTROL MESSAGING INTO MOBILE CONTROL CHANNEL SIGNALING USING A VOICE-OVER IP GATEWAY

BACKGROUND

1. Field of the Invention

The invention relates to the field of mobile communications and, more particularly, to the use of wireless networking in conjunction with mobile networks.

2. Description of the Related Art

Wireless networks are becoming increasingly prevalent with thousands of so called hotspots being deployed throughout the United States, Europe, and Asia. A hotspot refers to the coverage area surrounding a wireless access point within which a device can communicate wirelessly with the access point. The access point typically includes a wireless transceiver and is connected to a packet-switched communications network such as the Internet. As such, the access point provides network connectivity to those devices capable of establishing a wireless communications link with the access point. Mobile users can roam between multiple hot spots while maintaining connectivity with a communications network. Examples of hotspots or wireless networks can include those networks built around one of the 802.11 wireless communications protocols.

Such wireless networks largely function independently of mobile communications networks. These wireless networks, particularly 802.11 wireless networks, often function purely as data networks. That is, typically voice communications are not carried over such networks. In consequence, the voice capability of mobile networks has yet to be integrated with 802.11 wireless networks.

While solutions have been proposed that would allow roaming between wireless networks and mobile networks, these solutions have been proprietary in nature. To utilize a given wireless/mobile network roaming solution, mobile service providers would be required to alter existing mobile network infrastructure to interoperate with the chosen solution. In light of the significant amount of mobile network infrastructure already in place and the cost of maintaining that infrastructure, implementing such changes would be both costly and time consuming.

SUMMARY OF THE INVENTION

The present invention provides a method, system, and apparatus for allowing subscribers to freely roam between a mobile network and a wireless network without dropping a call. More particularly, the inventive arrangements disclosed herein provide a media gateway functionality that can convert Voice-Over Internet Protocol (VOIP) media control messaging into mobile control channel signaling, and vice versa. As such, the present invention allows the mobile network to handoff at least a portion of a call to the wireless network.

One aspect of the present invention can include a gateway serving as an interface between a mobile network and a wireless network. The gateway can be configured to send a signal strength indicator to the mobile network thereby causing the mobile network to recognize the gateway as a valid path for handing off a call. For example, the gateway can serve as an interface between a mobile network and a wireless network configured according to one of the 802.11 wireless communications protocols. The gateway can route the call from the mobile network to a wireless access point of the wireless network via a packet-switched network. Accordingly, the call can be conducted via a wireless communications link using the wireless access point. Notably, the signal strength indicator can be a fabricated signal strength indicator.

The gateway further can include a mobile network interface having a transport interface configured to exchange mobile control channel signaling data with the mobile network and a voice channel interface configured to exchange audio data with the mobile network. The gateway further can include a mobile control and messaging component configured to communicate with the mobile network via the transport interface, a call control component configured to format the mobile control channel signaling data from the mobile network for use over the packet-switched network, a voice media conversion component configured to format voice data for transmission over the packet-switched network using a real-time streaming protocol, and an interface to exchange call control data and voice data with the packet-switched network. The interface to the packet-switched network can be a Session Initiation Protocol interface.

Another aspect of the present invention can include a method of call control between a mobile network and a wireless network within a gateway interface. The method can include establishing, with a mobile network, a control messaging link for exchanging mobile control channel signaling data and a voice channel link for exchanging audio data for a mobile call, sending a signal strength indicator to the mobile network thereby causing the mobile network to recognize the gateway as a valid path for handing off the mobile call, and establishing a communications link with a packet-switched network. The mobile call can be routed from the mobile network to a wireless access point via the packet-switched network, such that the call is conducted via a wireless communications link with the wireless access point. As noted, the signal strength indicator can be a fabricated signal strength indicator.

The routing step can include routing the mobile call to the wireless access point via the packet-switched network using Session Initiation Protocol. Further, the wireless access point can be an 802.11 compliant wireless access point such that the wireless network is configured according to one of the 802.11 wireless communications protocols.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
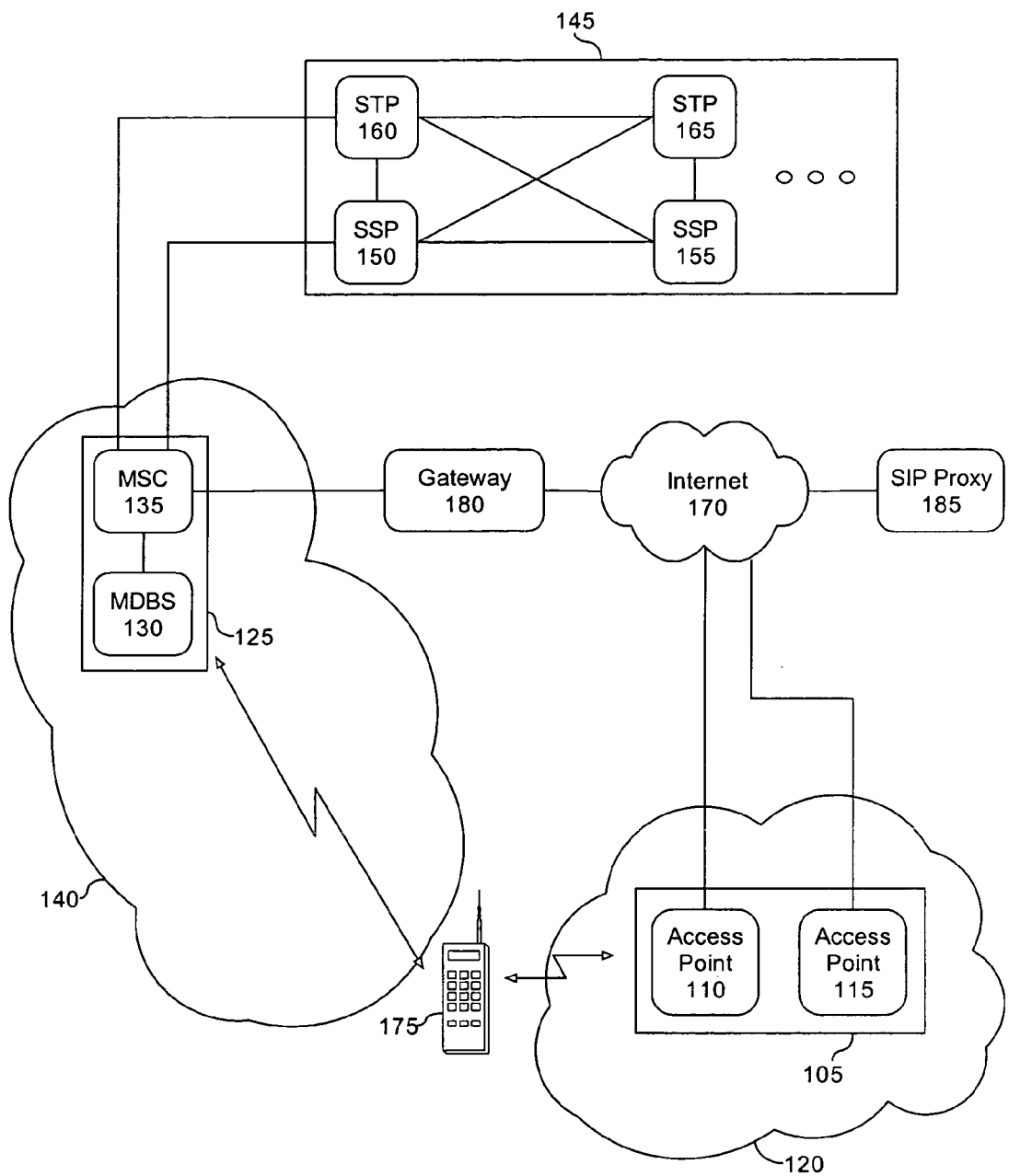
FIG. 1 is a schematic diagram illustrating a system for roaming between a mobile communications network and a wireless communications network in accordance with the inventive arrangements disclosed herein.

FIG. 1 is a schematic diagram illustrating a system 100 for roaming between one or more mobile communications networks (mobile networks) and a wireless communications network (wireless network) in accordance with the inventive arrangements disclosed herein. As shown, the system 100 can include one or more wireless networks 105, one or more mobile networks 125, a Public Switched Telephone Network (PSTN) 145, and a packet-switched network such as the Internet 170.

The wireless network 105 can be a wireless network that is compliant with any of the 802.11 communications protocols. As such, the wireless network 105 can include one or more access points 110 and 115. Access points 110 and 115 each can include a wireless transceiver for communicating with one or more mobile communication devices capable of communicating over an 802.11 wireless connection, for example mobile communications device 175. Each access point 110 and 115 further can include a wired connection to the Internet 170. Accordingly, each access point 110 and 115 is configured to serve as an interface between wireless or mobile communications devices communicating over an 802.11 communications protocol and packet-switched networks such as the Internet 170.

The mobile network 125 can be any of a variety of different wireless telephony networks including, but not limited to, a conventional cellular telephony network or a Personal Communications Service (PCS) network (hereafter referred to as a "mobile network"). The mobile network 125 can include one or more Mobile Data Base Stations (MDBS) 130 and a Mobile Switching Center (MSC) 135. As shown, the mobile network 125 can have a coverage area 140 within which mobile communications device 175 can wirelessly communicate with the MDBS 130 over a voice channel.

The MDBS 130 can send communications to and receive communications from wireless devices such as mobile communications device 175. For example, the MDBS 130 can include a tower (not shown) for wirelessly communicating with the mobile communications device 175. The tower can be communicatively linked with hardware and any necessary software within the MDBS 130 for converting data streams from the towers into valid signals and routing cellular (or mobile) switched data calls to the MSC 135 and/or to another mobile destination. The MDBS 130 manages and accesses the radio interface of the mobile communications device 175 from the mobile network side. The MSC 135 includes hardware and any necessary software for connecting calls by switching the digital voice data packets from one network path to another. The MSC 135 effectively routes calls between the MDBS 130, the PSTN 145, and/or the gateway 180. Additionally, the MSC 135 can provide information such as user registration, authentication, and location updating.

System 100 further can include a gateway 180. The gateway 180 can include hardware and any necessary software to serve as an interface between the mobile network 125 and the Internet 170. It should be appreciated, however, that the gateway 180 also can be configured to serve as an interface to the PSTN 145. While the gateway 180 can serve as an interface to the Internet 170, the gateway 180 also can be used as an interface to other packet-switched networks (not shown) such as Wide Area Networks, Local Area Networks, intranets, or the like.

In any case, the gateway 180 can format convert received data from the mobile network 125, the PSTN 145, and/or the Internet 170 for transmission over a different one of the networks. In illustration, the gateway 180 can receive data formatted for use over the mobile network 125, data formatted for use over a circuit-switched network such as the PSTN 145, and packet-switched data for use over the Internet 170. With regard to the Internet 170 or other packet-switched networks, the gateway 180 can send and receive Voice-Over Internet Protocol (VOIP) formatted data for conducting calls over such networks. The gateway 180 can convert data from one format to another so that data can be freely exchanged between the mobile network 125, the Internet 170, and/or the PSTN 145.

It should be appreciated that while the gateway 180 is depicted as being located separately from the mobile network 125, the gateway 180 need not be so located. Rather, the gateway 180 can be included as part of the PSTN 145, the Internet 170, or the mobile network 125.

The PSTN 145 can include Service Switching Points (SSP) 150 and 155, Signal Transfer Points (STP) 160 and 165, and one or more switching systems (not shown). The SSP's 150 and 155 are telephone switches interconnected by Switching System No. 7 (SS7) communication links. SSP's 150 and 155 perform call processing on calls that originate, tandem, or terminate at each respective site. The SSP's 150 and 155 can generate SS7 messages to transfer call-related information to other SSP's (not shown) or to query a Service Control Point (not shown) for routing instructions. The STP's 160 and 165 are switches that relay messages between network switches and databases. The STP's 160 and 165 can route SS7 messages to the correct outgoing signaling link based on SS7 message address fields.

A Session Initiation Protocol (SIP) server 185 can be communicatively linked with a packet-switched network such as the Internet 170. The SIP server 185 can be an application executing within a suitable information processing system having a communications link with the Internet 170. SIP is a standard protocol for initiating interactive user sessions that involve multimedia elements such as video, voice, chat, gaming, and virtual reality. SIP works in the Application layer of the Open Systems Interconnection (OSI) communications model to establish, modify, and terminate multimedia sessions or Internet telephony calls. The protocol also can be used to invite participants to unicast or multicast sessions that do not necessarily involve the initiator. Because SIP supports name mapping and redirection services, SIP allows users to initiate and receive communications and services from any location, and for networks to identify the users wherever the user may be located.

SIP is a request-response protocol, dealing with requests from clients and responses from servers. Participants are identified by SIP Uniform Resource Locators (URL's). Requests can be sent through any transport protocol, such as User Datagram Protocol (UDP), Stream Control Transmission Protocol (SCTP), or Transmission Control Protocol (TCP). SIP determines the end system to be used for the session, the communication media and media parameters, and the called party's desire to engage in the communication. Once these parameters are assured, SIP establishes call parameters at either end of the communication, and handles call transfer and termination.

The SIP server 185 can receive SIP invites from mobile communications devices such as mobile communications device 175. In one embodiment of the present invention, the SIP server 185 can be configured as a SIP proxy server. In that case, the SIP proxy server can utilize standard SIP look-up and directory schemas to identify the particular gateway having an affinity with the requestor. That is, the SIP proxy server can identify gateway 180 as the gateway associated with mobile network 125, and as the gateway to which SIP invites from mobile communications device 175, being registered with mobile network 125, are to be sent. The SIP proxy server can forward invites to the gateway having an affinity with the requesting device via the Internet 170. In another embodiment of the present invention, the SIP server 185 can be implemented as a SIP redirect server. In that case, the SIP redirect server can determine the gateway having an affinity with the requester and respond to the requester with the network location, for example a network address, of the proper gateway. Accordingly, the mobile communication device 175, upon receiving the response from the SIP redirect server, can communicate directly with that gateway.

The mobile communications device 175 can be configured to communicate over the mobile network 125 as well as the wireless network 105. The mobile communications device 175 can include transceivers for communicating over both mobile networks and wireless networks. Further, the mobile communications device 175 can be configured to measure the power of signals received from each network and vary the transmission strength of signals sent to each respective network. In addition, the mobile communications device 175 also can include a SIP user agent executing therein. The SIP user agent can encode and decode SIP formatted messages which are exchanged over the wireless network 105. In one embodiment of the present invention, the mobile communications device 175 can be implemented as a mobile phone. Still, those skilled in the art will recognize that any communications device configured as described herein can be used.

Figure 2:
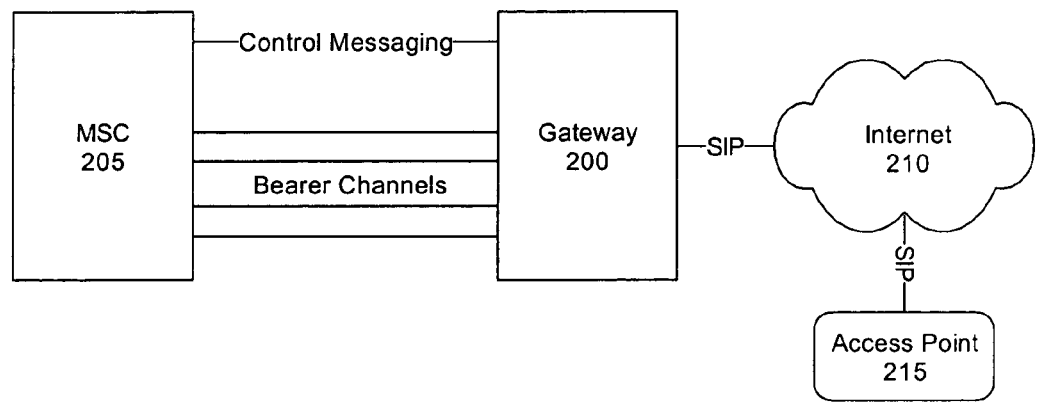
FIG. 2 is a schematic diagram illustrating one embodiment of a gateway that can be used with the system of FIG. 1 in accordance with the inventive arrangements disclosed herein.

FIG. 2 is a schematic diagram illustrating one embodiment of a gateway 200 that can be used with the system of FIG. 1 in accordance with the inventive arrangements disclosed herein. As shown, the gateway 200 can serve as an interface between the MSC 205 of a mobile network and a packet switched network such as the Internet 210. The gateway 200 can communicate with the MSC 205 using mobile communications protocols specific to the mobile network, and thus the MSC 205. For example, the gateway 200 can be communicatively linked with the MSC 205 via a control messaging channel and one or more bearer channels such as T1 and/or Integrated Services Digital Network (ISDN) lines over which voice communications can be carried.

The gateway 200 can decode mobile control channel signaling data and/or voice data received from the MSC 205 of the mobile network and format convert the data for transmission over the Internet 210. The gateway 200 can packetize data from the MSC 205 for transmission over the Internet 210 using SIP. Similarly, packetized data received from the Internet 210 can be decoded and format converted for transmission over the cellular network via the MSC 205. Call control and voice data received from the Internet 210 can be processed and provided to the MSC 205. In particular, call control messages can be provided to the MSC 205 over a control messaging channel while voice data can be provided over one or more of the bearer channels. In this manner, the gateway 200 can communicate with the access point 215 as shown via the packet-switched network.

In one embodiment of the present invention, the gateway 200 can be configured to translate mobile call data and Voice-Over Internet Protocol (VOIP) call data from one format to the other. That is, the gateway 200 can convert mobile voice channel data and mobile control channel signaling data from the MSC 205 to VOIP streaming voice data and media control messaging data respectively. Similarly, the gateway 200 can convert VOIP streaming voice data and media control messaging data to mobile voice channel data and mobile control channel signaling data.

Figure 3:
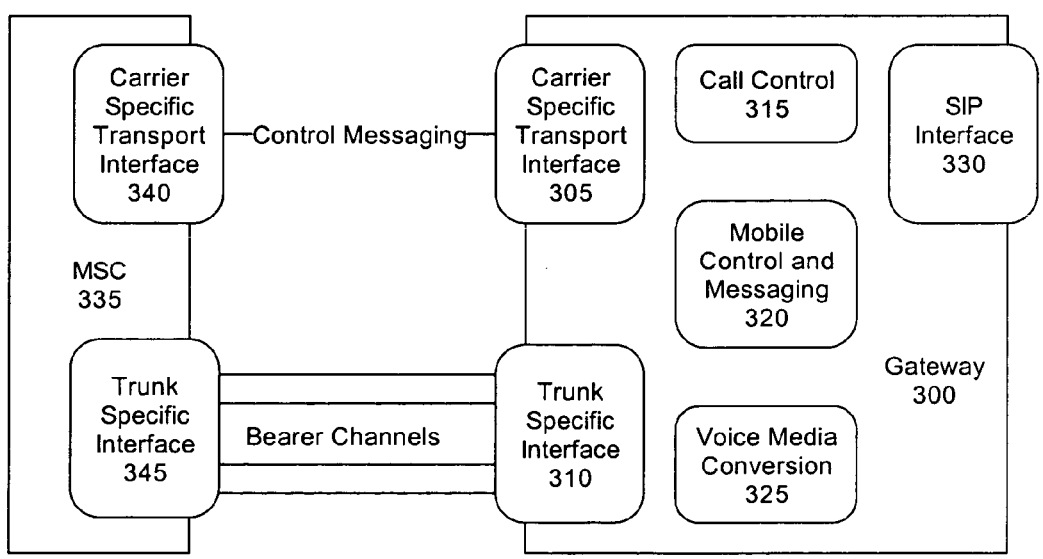
FIG. 3 is a schematic diagram illustrating another embodiment of a gateway that can be used with the system of FIG. 1 in accordance with the inventive arrangements disclosed herein.

FIG. 3 is a schematic diagram illustrating another embodiment of a gateway 300 that can be used with the system of FIG. 1 in accordance with the inventive arrangements disclosed herein. As shown, the gateway 300 is communicatively linked with a MSC 335 via a control messaging channel and one or more bearer channels as described herein.

The gateway 300 can include a carrier specific transport interface (CSTI) 305, a trunk specific interface (TSI) 310, a call control module 315, a mobile control and messaging module (MMCM) 320, a voice media conversion module 325, and a SIP interface 330. The CSTI 305 can be configured to exchange mobile control channel signaling data with the CSTI 340 of the MSC 335. The CSTI 305 can be matched to the CSTI 340 to use the same protocols and communications schemes as the MSC 335 and the mobile network within which the MSC 335 is disposed. For example, the CSTI 305 can be configured to encode and decode data using control schemas such as ISDN User Part (ISUP), IS-41, IS-MAP, GSM-MAP, and the like. Similarly, the TSI 310 can be configured to exchange voice data with the TSI 345 of the MSC 335. The TSI 310 can be matched to the TSI 345 so that both can exchange voice data over a common voice channel, whether a T1 and/or an ISDN line.

The voice media conversion module 325 can format convert received voice data for transmission to the MSC 335 and/or the Internet. For example, the voice media conversion module 325 can receive voice data from the mobile network via one or more of the bearer channels and format the data using a real time streaming protocol such as Real Time Protocol (RTP) for use with packet-switched networks. The voice media conversion module 325 further can receive packet-switched data from the Internet via the SIP interface and format any streaming voice data for transmission over one of the bearer channels to the MSC 335.

The MCMM 320 can receive control channel signaling data from the MSC 335 via the CSTI 305 as well as generate and send mobile control channel signaling data to the MSC 335 via the CSTI 305. The MCMM 320 can analyze received mobile control channel signaling data and, under particular conditions to be described herein, send signal strength indicators to the MSC 335 which cause the MSC 335 to handoff an ongoing mobile call to the gateway 300.

The call control module 315 can interact with the MCMM 320 to perform any necessary data formatting and/or data translations of mobile control channel signaling data from the MSC 335 to media control messaging data for use over a packet-switched network such as the Internet. Likewise, the call control module 315 can process media control messaging data received from the Internet via the SIP interface 330 and translate the data to a format that can be used and transmitted over one of the control messaging channels of the mobile network to the MSC 335. For example, media control messaging data can be format converted to mobile control channel signaling data.

The SIP interface 330 can receive packet-switched data from the Internet and separate call control data from voice data. The SIP interface 330 can provide any media control messaging data to the call control module 315 for processing and any streaming voice data to the voice media conversion module 325 for processing. Media control messaging data received from the call control module 315 and streaming voice data from the voice media conversion module can be processed and sent over the Internet using SIP.

Figure 4:
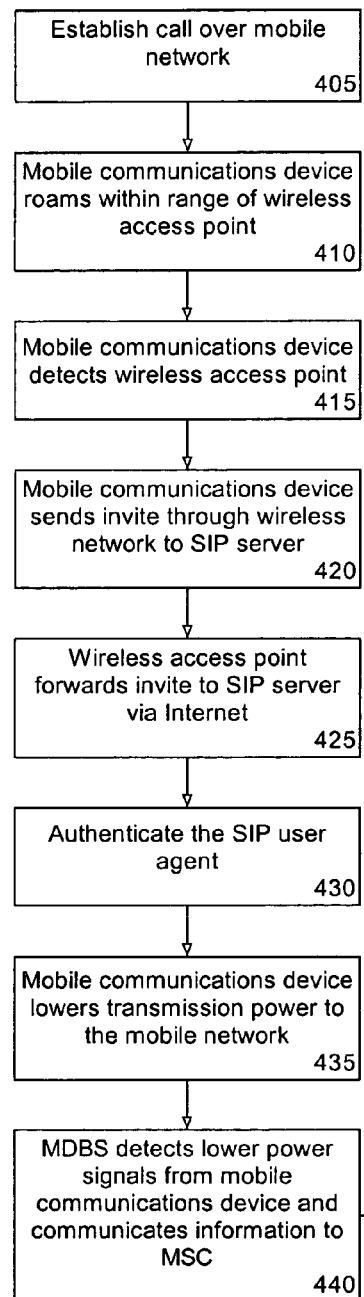
FIG. 4 is a flow chart illustrating a method of roaming between a mobile network and a wireless network in accordance with the inventive arrangements disclosed herein.
Figure 4:
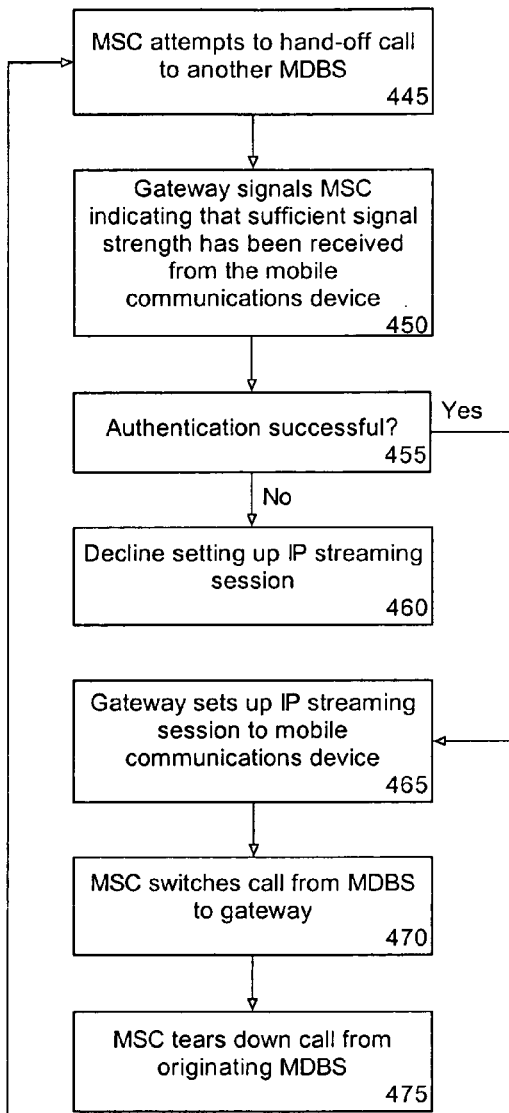

FIG. 4 is a flow chart illustrating a method 400 of roaming between a mobile network and a wireless network in accordance with one aspect of the present invention. The method 400 can begin in a state where a user has a mobile communications device, such as a telephone, that is configured to communicate over mobile networks and an 802.11 compliant wireless network. Further, the mobile communications device can include a SIP user agent executing therein.

The method can begin in step 405 where a user activates the mobile communications device and establishes a call over a mobile network. Once the call is established, in step 410, the user and communications device can roam within range of an 802.11 compliant wireless access point. In step 415, the mobile communications device can detect the wireless access point and in step 420 send a SIP invite to the wireless access point via a wireless communications link. In step 425, the access point forwards the invite to the SIP server.

In one embodiment, the SIP server can be a SIP proxy server. The SIP proxy server can determine a gateway with which the requesting mobile communications device has an affinity. The SIP proxy server determines a network address for the gateway having an association with the user agent disposed within the mobile communications device that issued the SIP invite. For example, the SIP proxy server can determine the gateway belonging to the carrier network to which the caller has subscribed, and over which the mobile communications device is communicating. Accordingly, the SIP proxy server can forward the received invite to the determined gateway. The determined gateway receives the SIP invite from the SIP proxy server.

In another embodiment, the wireless access point forwards the invite to a SIP redirect server via the Internet or another packet-switched network. The SIP redirect server determines the gateway with which the requesting mobile communications device has an affinity. More particularly, the SIP redirect server determines an address for the gateway having an affinity with the user agent disposed within the mobile communications device that issued the SIP invite. The SIP redirect server sends a response to the requesting user agent. The response specifies the address of the determined gateway. The mobile communications device can send a SIP invite to the gateway indicated by the response received from the SIP redirect server. More particularly, the user agent disposed within the mobile communications device can send the SIP invite to the specified address. The selected gateway receives the SIP invite from the SIP agent in the mobile communications device.

In step 430, the gateway authenticates the SIP user agent executing within the mobile communications device. In step 435, the mobile communications device can lower the transmission power used to transmit to the mobile network. In one embodiment of the present invention, the mobile communications device can be configured to compare the strength or power of detected signals from both the mobile network and the wireless network. Accordingly, if the signal strength detected from the wireless network exceeds the signal strength detected from the mobile network, the mobile communications device can be configured to lower the power used to transmit to the mobile network, or otherwise attenuate signals being sent to the mobile network. If not, the mobile communications device need not transmit signals at reduced power to the mobile network, or otherwise attenuate signals sent to the mobile network. As such, the call can continue over the mobile network.

In step 440, the MDBS detects and measures the weakened signals being transmitted from the mobile communications device. The MDBS can communicate this information to the MSC. In step 445, having received information regarding the weakened signals from the mobile communications device, the MSC attempts to hand-off the call to another MDBS. It should be appreciated that the mobile communications device can be configured or programmed to reduce transmission power to the mobile network or attenuate signals sent to the mobile network to a predetermined level such that when the weakened signals from the mobile communications device are detected by the mobile network, a hand-off condition in the MSC is triggered. That is, the MSC can initiate a hand-off when the power of signals received from the mobile communications device are measured to be less than a threshold level. The MSC also can be configured to notify the gateway of any detected hand-off conditions. For example, the gateway can appear to the MSC as another MDBS. As such, when the MSC begins polling for a MDBS to which the mobile call can be handed off, the gateway can respond affirmatively.

In step 450, the gateway signals the MSC using a standard communications protocol, for example using ISUP, IS-41, IS-MAP, GSM-MAP, or the like, that the gateway has received a signal having a minimum power or strength from the mobile communications device. For instance, the wireless access point can detect the strength of the signal received from the mobile communications device and provide that information to the gateway. In another embodiment, the gateway can be configured to send a false or fabricated signal strength indicator to the MSC. For example, the gateway can be configure to send an signal strength indicator of a predetermined value representing a sufficient signal strength so that the MSC routes the mobile call to the gateway. In either case, the MSC can recognize the gateway as a valid path for handing off the call as the gateway has indicated that a signal of sufficient strength has been received from the mobile communications device.

In step 455, the gateway can determine whether the authentication of the SIP user agent in the mobile communications device was successful. If not, the method can proceed to step 460 where the gateway declines to set up an IP streaming session with the mobile communications device. In that case, the method can end and the call can remain with the mobile network. If the SIP user agent is successfully authenticated, the method can proceed to step 465.

In step 465, the gateway sets up an IP streaming session with the mobile communications device via the access point. In step 470, the MSC switches the call from the MDBS to the gateway. After completion of step 470, the leg or portion of the call involving the mobile communications device and user is conducted over the 802.11 wireless network. Depending upon the location of the other call participant, other legs of the call can be conducted over the Internet as an IP-based call, the PSTN as a conventional call, the mobile network as a mobile call, or another wireless network conforming with one of the 802.11 communications protocols. In step 475, the MSC can tear down the call originating from the MDBS.

The method described herein has been provided for purposes of illustration only. As such, it should be appreciated that particular steps can be performed in varying order without departing from the spirit or essential attributes of the present invention.

The present invention provides a solution that allows mobile communications device users to roam freely between mobile networks and 802.11 wireless networks. The embodiments disclosed herein support both voice and data communications between mobile and wireless networks. As such, mobile users can continue to access both voice and data services whether in proximity to a mobile network or a wireless network as described herein.

The present invention can be realized in hardware, software, or a combination of hardware and software. Aspects of the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

Aspects of the present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. Within a gateway interface, a method of call control between a mobile network and a wireless network comprising:
   establishing, with a mobile switching center of said mobile network, a control messaging link for exchanging mobile control channel signaling data, and a voice channel link for exchanging audio data for a mobile call, wherein said gateway appears as an additional mobile data base station of the mobile network to the mobile switching network;
   establishing a communications link with a packet-switched network;
   receiving a SIP invite from a mobile device over the packet-switched network indicating that the mobile device will lower a transmit signal power to produce weakened signals to trigger a hand-off from the mobile network to the wireless network;
   sending a heightened signal strength indicator to the mobile data base station currently handling the mobile call responsive to receiving the SIP invite for prompting the mobile switching center to recognize the gateway as a preferred path for handing off the mobile call; and
   routing the mobile call from said mobile data base station to a wireless access point via the packet-switched network, such that the call is conducted via a wireless communications link using the wireless access point.

2. The method of claim 1, wherein the signal strength indicator is fabricated.

3. The method of claim 1, said routing step comprising routing the mobile call to the wireless access point via the packet-switched network using Session Initiation Protocol.

4. The method of claim 1, wherein the wireless access point is an 802.11 complaint wireless access point and the wireless network is configured according to one of the 802.11 wireless communications protocols.

5. A method for mobile device handoff between a mobile network and a wireless network comprising:
   on a mobile device, detecting a wireless access point of the wireless network;
   on said mobile device, sending a SIP invite to a gateway informing the gateway that the mobile device will lower a transmit signal power to produce weakened signals to trigger a hand-off from the mobile network to the wireless network, and lowering a transmission power to a mobile data base station of said mobile network currently handling communications with said mobile device;
   on said mobile network, a mobile switching center detecting a lower power signal from said mobile device and identifying at least one mobile data base station of the mobile network available to handle communication with said mobile device, wherein a gateway serving as an interface between the mobile network and the wireless network is configured to appear as an additional data base station of the mobile network; and
   on a gateway associated with said wireless network, having previously received the SIP invite message informing the gateway that the mobile device will lower a transmit signal power to produce weakened signals, indicating to said mobile switching center that a heightened signal strength has been received from the mobile communication device for prompting the mobile switching center to handoff communications with said mobile device to said gateway for providing connectivity between said mobile switching center said mobile device through said wireless access point, wherein said heightened signal strength is not indicative of actual signal strength of said mobile device.

6. The method of claim 5, further comprising on said mobile device, sending the SIP invite through a wireless network to a SIP server;
   on said gateway, forwarding said SIP invite to said SIP server via Internet; and
   authenticating a SIP user agent on said mobile device.

7. The method of claim 6, further comprising:
   upon authenticating said SIP user agent, setting up an internet protocol (IP) streaming session between said gateway and mobile device;
   switching over from said mobile data base station currently handling communications with said mobile device to said gateway; and
   tearing down communications between said mobile network and said mobile device, for handing off said mobile device from a mobile network to a wireless network.

* * * * *